United States Patent [19]

Scharpf

[11] 4,359,027
[45] Nov. 16, 1982

[54] TWO-CYCLE INTERNAL COMBUSTION ENGINE HAVING HIGH SWIRL COMBUSTION CHAMBER

[75] Inventor: Otto H. Scharpf, Brookfield, Wis.

[73] Assignee: Outboard Marine Corporation, Waukegan, Ill.

[21] Appl. No.: 189,010

[22] Filed: Sep. 22, 1980

[51] Int. Cl.$^3$ .............................................. F02B 23/08
[52] U.S. Cl. ............................ 123/307; 123/193 CH; 123/193 CP; 123/193 P; 123/193 H; 123/290; 123/262; 123/269; 123/257
[58] Field of Search .......... 123/307, 193 CH, 193 CP, 123/193 P, 193 H, 289, 290, 269, 262, 257

[56] References Cited

U.S. PATENT DOCUMENTS

| | | |
|---|---|---|
| 1,110,332 | 9/1914 | Miller .................................. 123/307 |
| 2,063,374 | 12/1936 | Hansen et al. . |
| 2,231,392 | 2/1941 | McCarthy . |
| 2,269,084 | 1/1942 | McCarthy . |
| 2,504,036 | 4/1950 | Morrison . |
| 3,494,335 | 2/1970 | Meier . |
| 4,026,250 | 5/1977 | Funiciello . |
| 4,088,098 | 5/1978 | Rose et al. . |
| 4,143,624 | 3/1979 | Schmidt . |

FOREIGN PATENT DOCUMENTS

| | | | |
|---|---|---|---|
| 645974 | 5/1937 | Fed. Rep. of Germany ...... | 123/290 |
| 802762 | 9/1936 | France ................................ | 123/307 |

Primary Examiner—P. S. Lall
Attorney, Agent, or Firm—Michael, Best & Friedrich

[57] ABSTRACT

Disclosed is a two-cycle, internal combustion engine including an engine block, and a cylinder in the engine block having a head and generally opposed inlet and outlet walls respectively including at least one intake port through which a fresh charge is admitted into the cylinder and at least one outlet port through which exhaust gases are exhausted from the cylinder. A piston is mounted for reciprocative movement inside the cylinder between a first position spaced from the cylinder head wherein the intake port is uncovered, a top dead center position, and a third position wherein the piston approaches the top dead center position. The piston has a top, an inlet face portion which periodically covers and uncovers the intake port and an outlet face portion which periodically covers and uncovers the outlet port. The piston and cylinder have a configuration causing increased swirling of the fresh charge in the cylinder as the piston moves from the third position to the top dead center position. The piston and cylinder are constructed so as to form two spaced apart chambers in the cylinder when the piston is in the third position and for causing that portion of the charge in one of the chambers to be forced into the other of the chambers as the piston moves to the top dead center position.

14 Claims, 5 Drawing Figures

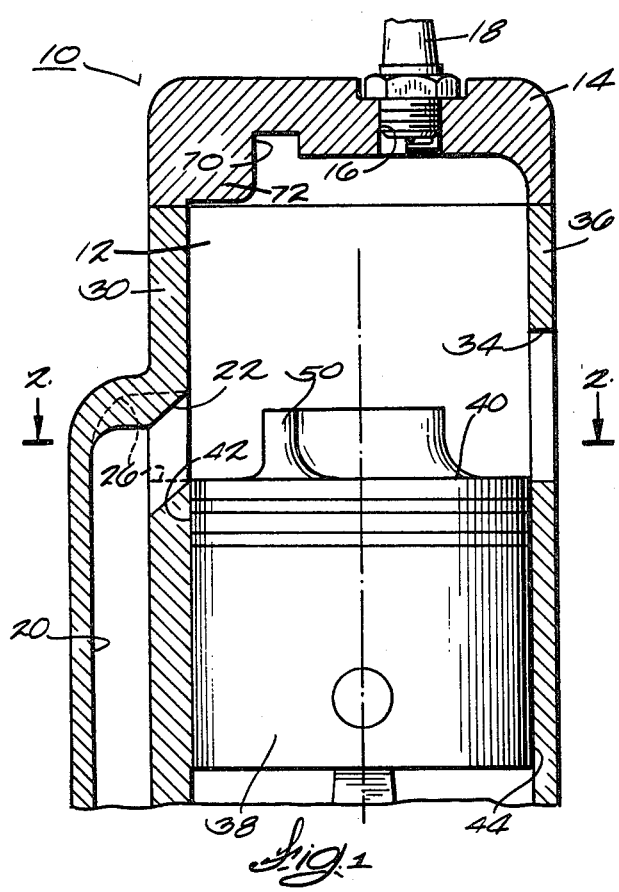
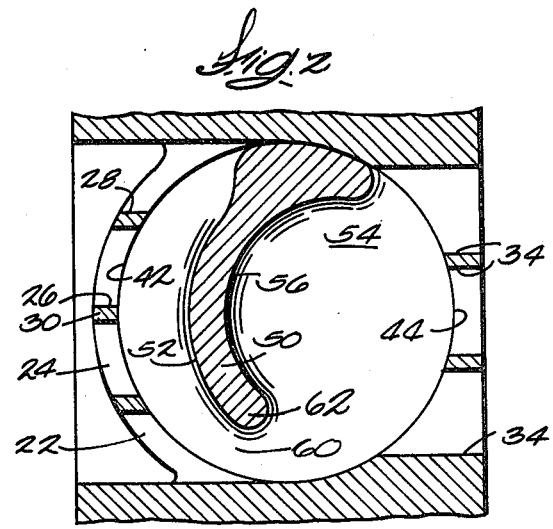
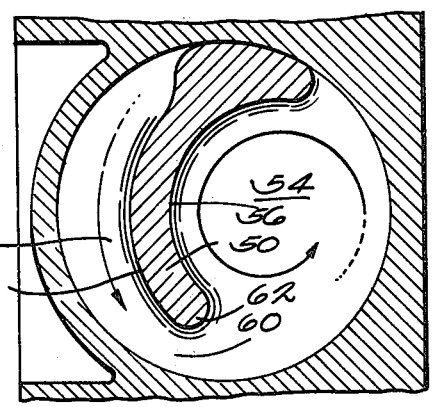
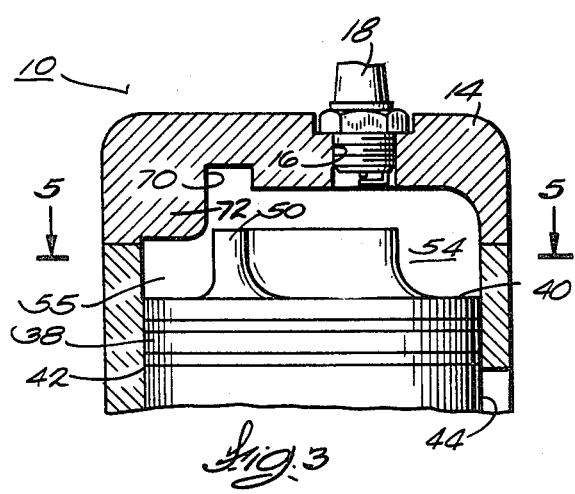

TWO-CYCLE INTERNAL COMBUSTION ENGINE HAVING HIGH SWIRL COMBUSTION CHAMBER

FIELD OF THE INVENTION

The invention relates to two-cycle, internal combustion engines and more particularly to a piston and cylinder head construction adapted to increase swirling of the incoming charge in the combustion chamber to thereby promote mixing of fuel vapor and air in the combustion chamber and to accelerate flame propagation during combustion of the fuel mixture.

BACKGROUND PRIOR ART

Examples of prior art piston and cylinder constructions for use in two-cycle internal combustion engines are shown in the Rose et al. U.S. Pat. No. 4,088,098 issued May 9, 1978 and in the Meier U.S. Pat. No. 3,494,335, issued Feb. 10, 1970.

Attention is also directed to the Funiciello U.S. Pat. No. 4,026,250, issued May 31, 1977; the McCarthy U.S. Pat. No. 2,269,084, issued Jan. 6, 1942; the Hansen et al. U.S. Pat. No. 2,063,374, issued Dec. 8, 1936; the McCarthy U.S. Pat. No. 2,231,392, issued Feb. 11, 1941; the Sass U.S. Pat. No. 2,123,065, issued July 5, 1938; the Malin U.S. Pat. No. 2,483,288, issued Sept. 27, 1949; and the Morrison U.S. Pat. No. 2,504,036, issued Apr. 11, 1950.

Attention is further directed to the Taylor U.S. Pat. No. 2,699,765, issued Jan. 18, 1955; the Konishi et al. U.S. Pat. No. 4,041,923, issued Aug. 16, 1977; the Schmidt U.S. Pat. No. 4,143,624, issued Mar. 13, 1969; and the Scott U.S. Pat. No. 2,146,032, issued Feb. 7, 1939.

SUMMARY OF THE INVENTION

The invention includes a two-cycle, internal combustion engine comprising an engine block, and a cylinder in the engine block having a head and generally opposed inlet and outlet walls respectively including at least one intake port through which a fresh charge is admitted into the cylinder and at least one outlet port through which exhaust gases are exhausted from the cylinder. A piston is mounted for reciprocative movement inside the cylinder between a first position spaced from the cylinder head wherein the intake port is uncovered, a top dead center position, and a third position wherein the piston approaches the top dead center position. The piston has a top, an inlet face portion which periodically covers and uncovers the intake port, and an outlet face portion which periodically covers and uncovers the outlet port. Means are also provided for causing increased swirling of the fresh charge in the cylinder as the piston moves from the third position to the top dead center position. the means for causing swirling includes means for forming two spaced apart chambers in the cylinder when the piston is in the third position and for causing that portion of the charge in one of the chambers to be forced into the other of the chambers as the piston moves to the top dead center position.

One of the principal features of the invention is the further provision of means for causing swirling of the fresh charge as the charge enters the cylinder, such means being provided by at least one upwardly inclined intake port.

In a preferred embodiment of the invention the two spaced apart chambers are separated by a deflector carried on the piston top, the deflector including a curved wall extending across the piston top from one side of the piston toward an opposite side of the piston but terminating short of that opposite side.

In a preferred embodiment of the invention one of the two spaced apart chambers comprises a cylindrical chamber adjacent the outlet wall and the other of the two spaced apart chambers comprises a crescent shaped chamber adjacent the inlet wall, and the portion of the fresh charge in the crescent shaped chamber is forced into the cylindrical chamber circumferentially around the cylindrical chamber when the piston moves from the third position to the top dead center position.

Various other features and advantages of the invention are illustrated in the following description of a preferred embodiment, in the drawings and in the claims.

BRIEF DESCRIPTION OF THE DRAWINGS

FIG. 1 is a fragmentary, vertical section view of a two-cycle internal combustion engine embodying various features of the invention, and showing the piston in a position wherein a fresh charge is initially admitted into the cylinder.

FIG. 2 is a fragmentary, horizontal section view taken along the line 2—2 in FIG. 1.

FIG. 3 is a view similar to FIG. 1 but showing the piston approaching top dead center.

FIG. 4 is a view similar to FIGS. 1 and 3 but showing the piston at top dead center.

FIG. 5 is a cross section view taken along line 5—5 in FIG. 3 and showing the direction of the fuel charge swirl as the piston moves from the FIG. 3 to the FIG. 4 position.

Before explaining the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose for description and should not be regarded as limiting.

DESCRIPTION OF A PREFERRED EMBODIMENT

Illustrated in the drawings is an engine block 10 (shown fragmentarily) for a two-cycle internal combustion engine. The engine block 10 includes one or more cylinders 12, a cylinder head 14 having a threaded aperture 16 for receiving a spark plug 18 (shown fragmentarily) and a suitable transfer passage 20 which is located on one side of the cylinder 12 and is in communication with the engine crankcase.

A fresh charge of incoming gases, which comprises a mixture of fuel and air, when the engine employs a conventional carburetor, or air only, when direct fuel injection is used, flows from the transfer passage 20 into the cylinder 12 through one or more inlet or intake ports. In the specific construction illustrated, a plurality of circumferentially spaced intake ports 22, 24, 26 and 28 which are provided in the intake wall 30 of the cylinder 12 for this purpose and which are spaced axially from the cylinder head 14. The upper edges of all of the inlet ports 22, 24, 26 and 28 are located at substantially the same height.

The engine block 10 also includes an exhaust manifold (not shown) which is located on the side of the cylinder 12 opposite the transfer passage 20 and receives the combustion products or exhaust gases from the cylinder 12 through one or more exhaust or outlet ports 34 which are provided in the outlet wall 36 of the cylinder 12 and which are axially spaced from the cylinder head 14.

Mounted for reciprocative movement inside the cylinder 12 is a piston 38 (shown fragmentarily) which is connected to the engine crankshaft (not shown) by a suitable connecting rod (also not shown). The piston 38 includes a working surface or top wall 40 which is generally transverse to its direction of movement and which forms a wall of the combustion chamber. The piston 38 also includes a skirt which extends from the piston top wall 40 in the dirction away from the cylinder head 14 and which includes a face portion 42 which covers and uncovers the inlet ports 22, 24, 26 and 28 and a face portion 44 which covers and uncovers the outlet ports 34 as the piston 38 reciprocates during engine operation. The intake and outlet ports are positioned at relative heights to be uncovered by the piston 38 at a time most effective for proper scavenging of the exhaust gases from the cylinder 12 as the cylinder is filled with a fresh charge. In the specific construction illustrated, the upper edges of the outlet ports 34 are located closer to the cylindrical head 14 than the upper edges of the intake ports 22, 24, 26 and 28, so that the piston 38 uncovers the outlet ports 34 first during the down stroke, thereby releasing the pressure in the cylinder 12, before the inlet ports are uncovered to admit a fresh charge.

The fresh charge generally enters the cylinder 12 through the intake ports 26 and 28 in a direction generally perpendicular to the longitudinal axis of the cylinder as represented by the dashed line in FIG. 1, and the fresh charge entering the cylinder preferably fills the cylinder 12 progressively from the intake ports, upwardly to fill the upper part of the cylinder, and then toward the exhaust ports 34 so that a relatively uniform flow of the fresh charge propagates across the cylinder toward the exhaust ports 34 so as to effectively purge the exhaust gases from the cylinder 12 with a minimum loss of combustible products through the exhaust ports.

Means are also provided for causing swirling of the fresh charge in the cylinder 12 as the fresh charge enters the cylinder and as the piston 38 moves from the position wherein the fuel intake ports are open to its top dead center, such swirling having the advantage of promoting mixing of the fuel and air in the fresh charge and propagation of flame through the charge once the spark generated by the spark plug 18 has ignited the fuel mixture in the combustion chamber.

The means for effecting increased swirl in the combustion chamber includes inclination of two of the inlet ports 22 and 24 at an angle from the horizontal and upwardly such that the fresh charge entering through those inlet ports is directed at an inclination upwardly toward the cylinder head and also tangentially along the cylinder wall to thereby cause swirling of the charge in the combustion chamber. While the angle of inclination of the ports 22 and 24 is not critical, in the illustrated construction, the angle is 45°.

The means for effecting swirling of the fuel mixture of fresh charge also includes a curved deflector 50 extending upwardly from the planar top wall 40 of the piston 38, the deflector 50 comprising a curved wall transverse to the plane of the top wall 40 of the piston 38, the curved deflector 50 extending across the top wall of the piston and generally bisecting that surface of the piston. As shown in FIG. 2, one side of the deflector 50 is defined by a concave curved wall 56 facing that portion of the cylinder wall 36 having the exhaust ports 34, the concave curved wall 56 and the opposed portion of the cylinder forming a shallow generally cylindrical chamber 54 located at one side of the cylinder. The opposite side of the deflector 50 is defined by a convex curved wall 52 which faces that side of the cylinder 12 having the inlet ports 22, 24, 26 and 28, these two surfaces forming a generally crescent shaped chamber 55.

When the piston 38 is in the position shown in FIG. 1, wherein the fuel mixture enters the cylinder 12, the deflector 50 functions to deflect that portion of the fresh charge flowing through the inlet ports 26 and 28 so as to cause an upward movement of that portion of the fresh charge in order to properly fill the cylinder and to achieve expulsion of the exhaust gases without expulsion of combustible material.

The deflector 50 is formed such that it extends only partially across the head of the piston 38, and the end of the deflector 50 terminates short of the edge of the piston so as to provide a gas flow passage 60 between the end 62 of the deflector and the cylinder wall. In the illustrated construction, the deflector 50 forms an arc about a point located at the center of the cylindrical chamber 54, the arc being greater than 90° but less than 180°.

The means for causing increased swirl of the fresh charge in the combustion chamber further includes an arcuate slot 70 formed in the cylinder head 14, the slot 70 having a shape, width and depth complementary to those of the deflector 50 such that when the piston 38 is in the top dead center position, the slot 70 in the cylinder head receives the deflector 50 in a mating relation. The cylinder head also includes a downward protruberance 72 having a shape such that it is received in mating relation in the crescent shaped slot when the piston is in the top dead center position.

In operation of the internal combustion engine shown in the drawings, when the piston 38 is in the position shown in FIG. 1 and such that the exhaust ports 34 have been opened and the intake ports 22, 24, 26 and 28 have subsequently been opened, a fresh charge will enter through the intake ports. That portion of the charge entering through the intake ports 26 and 28 will be directed generally perpendicularly to the longitudinal axis of the piston and will be deflected by the deflector 50 upwardly toward the cylinder head 14. That portion of the charge entering through the swirl ports 22 and 24 will be directed upwardly at an angle of approximately 45° with respct to the top wall 40 of the piston and also circumferentially in a counterclockwise direction (as viewed in FIG. 2) around the cylinder due to the 45° angle of the swirl ports. As is well known to those skilled in the art, if swirling of the fresh charge entering the cylinder can be achieved in the combustion chamber, increased mixing of the liquid fuel and the fuel vapor with the air in the fresh charge is accomplished. Such increased mixing caused by the inclination of the intake ports improves the combustion properties of the charge and facilitates more complete burning and cleaner burning of the fuel.

As the piston moves upwardly toward its top dead center position and as seen in FIG. 3, the upper portion of the deflector 50 begins to move into the complementary curved groove 70 in the cylinder head and a portion of the fresh charge is trapped in the crescent shaped chamber 55 shown in FIG. 3. As the piston continues its upward movement to top dead center, the volume of the crescent shaped chamber 55 decreases and the portion of the fuel charge therein is forced through the opening 60 between the end 62 of the deflector 50 and the cylinder wall and in a counterclockwise direction generally circumferentially around the cylinder wall. Such movement of this portion of the fresh charge around the end 62 of the deflector 50 and into the cylindrical chamber 54, as shown by the arrow in FIG. 5, is in effect, a high speed pulse forced into the cylindrical chamber 54 circumferentially, and thereby generates a further swirling of the charge in the cylindrical chamber. Such swirling in the shallow cylindrical chamber further improves the mixing of the fuel with air in the charge and continues as the spark plug 18 ignites the fuel charge. The continued swirling in the cylindrical chamber 54 then has the effect of increasing the rate of flame propagation through the fuel charge.

Various features of the invention are set forth in the following claims.

I claim:

1. A two-cycle, internal combustion engine comprising an engine block, a cylinder in said engine block having a head and generally opposed inlet and outlet walls respectively including at least one intake port which is spaced axially from said cylinder head and through which a fresh charge is admitted into said cylinder and at least one outlet port which is spaced axially from said cylinder head and through which exhaust gases are exhausted from said cylinder, a piston mounted for reciprocative movement inside said cylinder relative to a top dead center position and a second position wherein said piston approaches said top dead center position, said piston having a top, and a skirt extending from said piston top in the direction away from said cylinder head and including an inlet face portion which periodically covers and uncovers said intake port, said skirt also including an outlet face portion which periodically covers and uncovers said outlet port, and means for causing swirling of the fresh charge in the cylinder as the piston moves from said position to said top dead center position, said means for causing swirling including means on said cylinder head and on said piston top for forming two spaced apart and connected chambers in said cylinder when said piston is in said second position and for substantially reducing the volume of one of said chambers as compared to the volume of the other of said chambers as said piston moves to said top dead center position so as thereby to cause the portion of the charge in said one of said chambers to be forcibly swirled into the other of said chambers.

2. A two-cycle, internal combustion engine comprising an engine block, a cylinder in said engine block having a head and generally opposed inlet and outlet walls respectively including at least one intake port through which a fresh charge is admitted into said cylinder and at least one outlet port through which exhaust gases are exhausted from said cylinder, a piston mounted for reciprocative movement inside said cylinder relative to a top dead center position and a second position wherein said piston approaches said top dead center position, said piston having a top, and a skirt extending from said piston top in the direction away from said cylinder head and including an inlet face portion which periodically covers and uncovers said intake port, said skirt also including an outlet face portion which periodically covers and uncovers said outlet port, and means for causing swirling of the fresh charge in the cylinder as the piston moves from said second position to said top dead center position, said means for causing swirling including means on said cylinder head and in said piston top for forming two spaced apart and connected chambers in said cylinder when said piston is in said second position and for substantially reducing the volume of one of said chambers as said piston moves to said top dead center position so as thereby to cause the portion of the charge in said one of said chambers to be forcibly swirled into the other of said chambers.

3. A two-cycle, internal combustion engine as set forth in claim 2 wherein said other of said chambers is generally circular and wherein said portion of said charge is forced into said circular chamber circumferentially.

4. A two-cycle internal combustion engine as set forth in claim 3 wherein said means for forming said two spaced apart chambers includes a deflector carried on said piston top, said deflector including a curved wall extending across said piston top from one side of said piston toward another side of said piston but terminating short of said another side.

5. A two-cycle engine as set forth in claim 4 wherein said deflector includes a curved convex surface facing said inlet port and a curved concave surface facing said outlet port.

6. A two-cycle engine as set forth in claim 5 wherein said intake port is inclined upwardly and directs said fresh charge toward said head and circumferentially around said cylinder.

7. A two-cycle internal combustion engine as set forth in claim 2 wherein said means for forming said two spaced apart chambers includes a deflector carried on said piston top, said deflector including a curved wall extending across said piston top from one side of said piston toward another side of said piston but terminating short of said another side.

8. A two-cycle engine as set forth in claim 7 wherein said deflector includes a curved convex surface facing said inlet wall and a curved concave surface facing said outlet wall.

9. A two-cycle engine as set forth in claim 8 and wherein that portion of said piston top between said convex wall of said deflector and said inlet wall of said cylinder is closely adjacent said heat when said piston is in said top dead center position.

10. A two-cycle engine as set forth in claim 7 wherein said head includes a recess housing said deflector when said piston is in said top dead center position.

11. A two-cycle engine as set forth in claim 7 wherein said other of said two spaced apart chambers comprises a hollow cylindrical chamber adjacent said outlet wall and wherein said one of said two spaced apart chambers comprises a crescent shaped chamber adjacent said inlet wall, and wherein said portion of said fresh charge in said crescent shaped chamber is forced into said cylindrical chamber circumferentially around said cylindrical chamber when said piston moves from said second position to said top dead center position.

12. A two-cycle engine as set forth in claim 2 wherein said other of said two spaced apart chambers comprises a cylindrical chamber adjacent said outlet wall and wherein said one of said two spaced apart chambers comprises a crescent shaped chamber adjacent said inlet wall, and wherein said portion of said fresh charge in said crescent shaped chamber is forced into said cylindrical chamber circumferentially around said cylindrical chamber when said piston moves from said second position to said top dead center position.

13. A two-cycle engine as set forth in claim 12 wherein said intake port is inclined upwardly and directs said fresh charge toward said head and circumferentially around said cylinder.

14. A two-cycle engine as set forth in claim 2 wherein said intake port is inclined upwardly and directs said fresh charge toward said head and circumferentially around said cylinder.

* * * * *

UNITED STATES PATENT AND TRADEMARK OFFICE
CERTIFICATE OF CORRECTION

PATENT NO. : 4,359,027
DATED : November 16, 1982
INVENTOR(S) : Otto H. Scharpf

It is certified that error appears in the above-identified patent and that said Letters Patent are hereby corrected as shown below:

Column 1, line 55, delete "the", insert -- The --.

Column 3, line 66, delete "of", insert -- or --.

Column 5, line 44, after "said", insert -- second --.

Column 6, line 49, delete "heat", insert -- head --.

Signed and Sealed this

Fifth Day of March 1985

[SEAL]

Attest:

DONALD J. QUIGG

Attesting Officer    Acting Commissioner of Patents and Trademarks